United States Patent
Yi et al.

(10) Patent No.: US 10,127,309 B2
(45) Date of Patent: Nov. 13, 2018

(54) AUDIO INFORMATION RETRIEVAL METHOD AND DEVICE

(71) Applicant: Alibaba Group Holding Limited, George Town, Grand Cayman (KY)

(72) Inventors: Dong Yi, Beijing (CN); Yeming Xiao, Beijing (CN); Rong Liu, Beijing (CN); Lun Zhang, Beijing (CN); Rufeng Chu, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 9 days.

(21) Appl. No.: 15/152,187

(22) Filed: May 11, 2016

(65) Prior Publication Data

US 2016/0335347 A1    Nov. 17, 2016

(30) Foreign Application Priority Data

May 11, 2015   (CN) .......................... 2015 1 0235892

(51) Int. Cl.
| | | |
|---|---|---|
| G06F 17/00 | (2006.01) | |
| G06F 17/30 | (2006.01) | |
| G10L 25/54 | (2013.01) | |
| G10L 25/03 | (2013.01) | |

(52) U.S. Cl.
CPC .. *G06F 17/30743* (2013.01); *G06F 17/30778* (2013.01); *G10L 25/03* (2013.01); *G10L 25/54* (2013.01)

(58) Field of Classification Search
CPC ........ G06F 17/30743; G06F 17/30778; G10L 25/03; G10L 25/54
USPC ................. 379/67.1–88.28; 700/94
See application file for complete search history.

(56) References Cited

U.S. PATENT DOCUMENTS

| | | | |
|---|---|---|---|
| 5,136,655 A | 8/1992 | Bronson | |
| 6,011,854 A | 1/2000 | Ryzin | |
| 6,115,035 A | 9/2000 | Compton et al. | |
| 6,469,749 B1 | 10/2002 | Dimitrova | |
| 6,532,477 B1 | 3/2003 | Tang et al. | |
| 6,697,796 B2 | 2/2004 | Kermani | |
| 6,766,103 B2 | 7/2004 | Kim et al. | |
| 6,856,997 B2 | 2/2005 | Lee et al. | |
| 7,516,074 B2 * | 4/2009 | Bilobrov | G06F 17/30743 704/270 |
| 7,562,012 B1 | 7/2009 | Wold et al. | |
| 7,627,477 B2 * | 12/2009 | Wang | G06K 9/00536 341/110 |

(Continued)

OTHER PUBLICATIONS

Ghosal, Perceptual Feature-Based Song Genre Classification Using Ransac, International Journal of Computational Intelligence Studies, Jan. 2015, p. 30-46, Adamas University.

*Primary Examiner* — Hemant Patel (57) ABSTRACT

Embodiments of the present invention provide an audio information retrieval method and device. The method includes acquiring a spectrogram of an audio clip, extracting a local feature of at least one energy extreme point in the spectrogram to use as a local feature sequence of the audio clip, and conducting an audio information retrieval according to the local feature sequence of the audio clip to acquire audio information. Embodiments of the present invention reduce the probability of a missed match (e.g., false negative) and improve the accuracy of audio information retrieval.

20 Claims, 9 Drawing Sheets

(56) References Cited

U.S. PATENT DOCUMENTS

| | | | |
|---|---|---|---|
| 7,818,167 B2* | 10/2010 | Kim | G06F 17/30743 704/200.1 |
| 9,275,141 B2* | 3/2016 | Wang | G06F 17/30861 |
| 2002/0111917 A1 | 8/2002 | Hoffman et al. | |
| 2004/0148159 A1 | 7/2004 | Crockett et al. | |
| 2007/0118375 A1 | 5/2007 | Kenyon et al. | |
| 2009/0012638 A1 | 1/2009 | Lou | |
| 2009/0259690 A1* | 10/2009 | Bogdanov | G10L 25/48 |
| 2011/0173185 A1* | 7/2011 | Vogel | G06F 17/30038 707/722 |
| 2012/0078894 A1* | 3/2012 | Jiang | G06F 17/30743 707/723 |
| 2012/0221131 A1 | 8/2012 | Wang et al. | |
| 2013/0110870 A1 | 5/2013 | Conwell | |
| 2014/0135964 A1* | 5/2014 | Eom | G06F 17/30743 700/94 |
| 2014/0195501 A1* | 7/2014 | Vlack | G06F 17/30743 707/693 |
| 2014/0310006 A1 | 10/2014 | Anguera Miro et al. | |
| 2015/0043745 A1 | 2/2015 | Juzswik et al. | |
| 2015/0071449 A1 | 3/2015 | Ozcan | |
| 2015/0117664 A1 | 4/2015 | Mossner et al. | |
| 2015/0154968 A1 | 6/2015 | Kastner et al. | |
| 2015/0163587 A1 | 6/2015 | Li | |
| 2015/0248896 A1 | 9/2015 | Lehtiniemi et al. | |
| 2015/0254338 A1 | 9/2015 | Cheluvaraja et al. | |
| 2015/0295666 A1 | 10/2015 | Smereka et al. | |
| 2015/0297131 A1 | 10/2015 | Triki | |
| 2015/0304768 A1 | 10/2015 | Prakash et al. | |
| 2015/0356528 A1 | 10/2015 | Depke et al. | |
| 2015/0331661 A1 | 11/2015 | Kalampoukas et al. | |
| 2015/0332702 A1 | 11/2015 | Disch et al. | |
| 2016/0098395 A1 | 4/2016 | DuBose | |

\* cited by examiner

AUDIO INFORMATION RETRIEVAL METHOD AND DEVICE

CROSS-REFERENCE TO RELATED APPLICATION

This application claims priority to Chinese Patent Application No. 201510235892.8, filed on May 11, 2015, which is incorporated herein by reference in its entirety.

TECHNICAL FIELD

Embodiments of the present invention relate to the field of audio processing, and, more specifically, to an audio information retrieval method and device.

BACKGROUND

Most existing music retrieval methods analyze a spectrogram and may be classified into two types: methods based on extreme points and methods based on texture analysis.

For music retrieval methods based on texture analysis, a music clip is first transformed using a short-time Fourier transform to generate a spectrogram, and the spectrogram is divided into 32 sub-bands. A gradient polarity of adjacent sub-bands is calculated. In this way, the original signal is compressed into a compact binary encoding, and a hash table is used for accelerating retrieval. Music retrieval methods based on texture analysis lack robustness to block noise, are higher in calculation complexity, and have longer retrieval times. A method is needed that is more robust to block noise, and faster in retrieval speed, such as a method based on extreme points.

For methods based on extreme points, a music clip is first transformed using a short-time Fourier transform to generate a spectrogram, and a maximum value point in the spectrogram is detected. A hash table is generated according to the frequency and time differences between adjacent extreme point pairs. During retrieval, a corresponding matching point between a music clip and a music library is matched using the hash table. Next, an offset and a degree of confidence for each music clip is estimated according to a time coordinate of the matching point. The music clip with the highest degree of confidence or having a degree of confidence beyond a threshold is retrieved. However, in these methods, detection of an extreme point is relatively sensitive to random noise and "Salt-and-Pepper" noise, which can easily cause an offset in frequency and time directions. A slight offset of the extreme point may completely change the hash value, which may cause a match to be missed, and may greatly affect the accuracy of the audio information retrieval.

SUMMARY

Embodiments of the present application provide an audio information retrieval method and device to reduce the probability of a missed match, and improve the accuracy of audio information retrieval.

According to one embodiment, a method for retrieving audio information from an audio clip is disclosed. The method includes acquiring a spectrogram of the audio clip, identifying at least one energy extreme point in the spectrogram, determining an image block of the spectrogram for each of the at least one energy extreme point, extracting a local feature of the image block for the at least one extreme point, adding the local feature to a local feature sequence of the audio clip, and retrieving the audio information from the audio clip based on the local feature sequence of the audio clip.

According to another embodiment, a method for storing a local feature sequence in an audio feature library is disclosed. The method includes acquiring a spectrogram of an audio file, extracting a local feature of at least one energy extreme point in the spectrogram of the audio file, generating the local feature sequence of the audio file using the at least one energy extreme point, and storing the local feature sequence of the audio file in the audio feature library.

According to a yet another embodiment, an audio information retrieval device is disclosed. The device includes a main memory, and a processor communicatively coupled to the main memory that acquires a spectrogram of an audio clip, identifies at least one extreme point of the spectrogram, determines, for the at least one extreme point, that the energy extreme point is on an image block of the spectrogram, extracts a local feature of the image block for the at least one energy extreme point to generate a local feature sequence of the audio clip, and retrieves audio information of the audio clip using the local feature sequence.

DESCRIPTION OF THE DRAWINGS

To describe the technical solution of the embodiments of the application more clearly, the following briefly introduces the accompanying drawings. The accompanying drawings in the following description merely show some embodiments of the application, and persons of ordinary skill in the art may still derive other drawings from these accompanying drawings without creative effort.

DETAILED DESCRIPTION

To make the objectives, technical solutions, and advantages of the embodiments of the application clear, the following clearly and completely describes the technical solutions of the embodiments of the application with reference to the accompanying drawings in the embodiments of the application. The described embodiments are some, but not all of the embodiments of the application.

Figure 1:
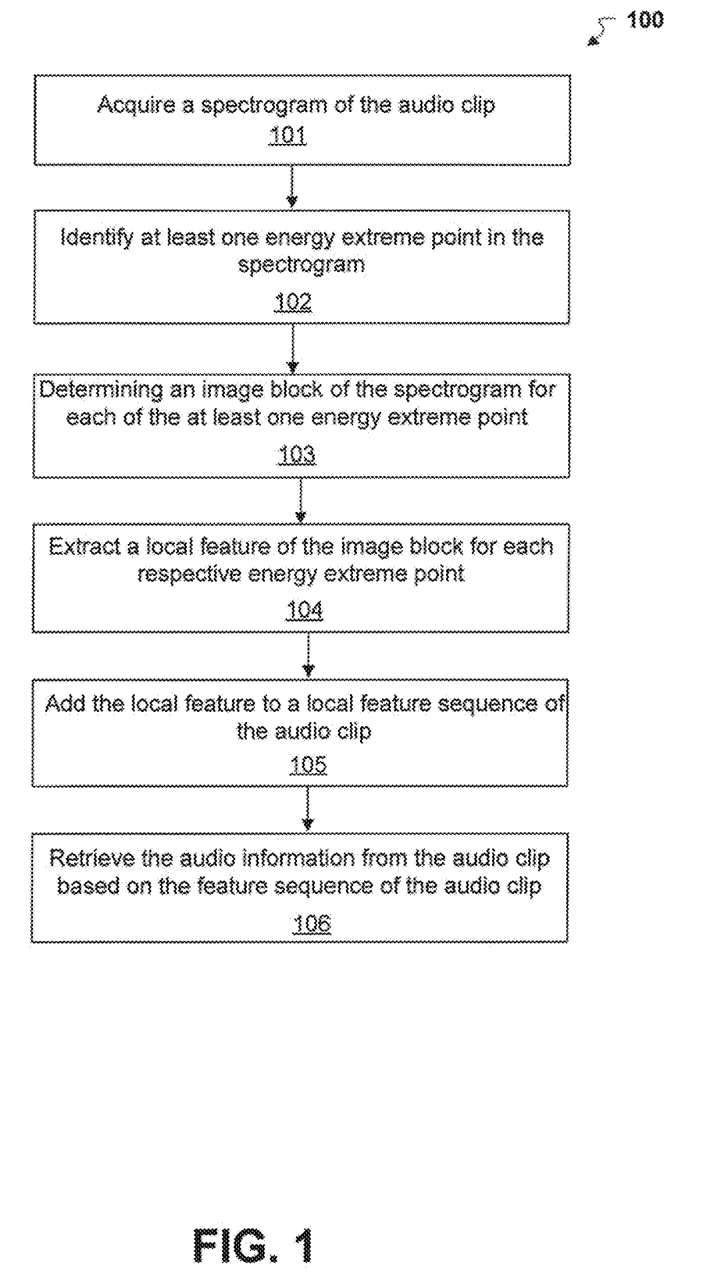
FIG. 1 is a flowchart depicting an exemplary sequence of computer implemented steps for performing audio information retrieval according to embodiments of the present invention.

With regard to FIG. 1, a flow diagram 100 of an exemplary sequence of computer implemented steps for performing audio information retrieval is depicted according to embodiments of the present invention. In step 101, a spectrogram of an audio clip is acquired. In step 102, at least one energy extreme point is identified in the spectrogram. A wave filter may be used to filter a maximum value on the spectrogram of the audio clip to acquire the position of the energy maximum value on the spectrogram, where the size and the shape of the wave filter may be adjusted for the specific application. At step 103, an image block of the spectrogram is determined for the energy extreme points. For example, the method may include selecting a window region where each energy extreme point serves as a center on the spectrogram, where the size of the window region is not limited and may be adaptively set for the specific application. In step 104, a feature of the image block of each energy extreme point is extracted to use as a local feature of the audio clip. In step 105, the local feature is added to a local feature sequence of the audio clip. In step 106, the local feature sequence of the audio clip is used to acquire audio information of the audio clip (e.g., an audio information retrieval).

Figure 2:
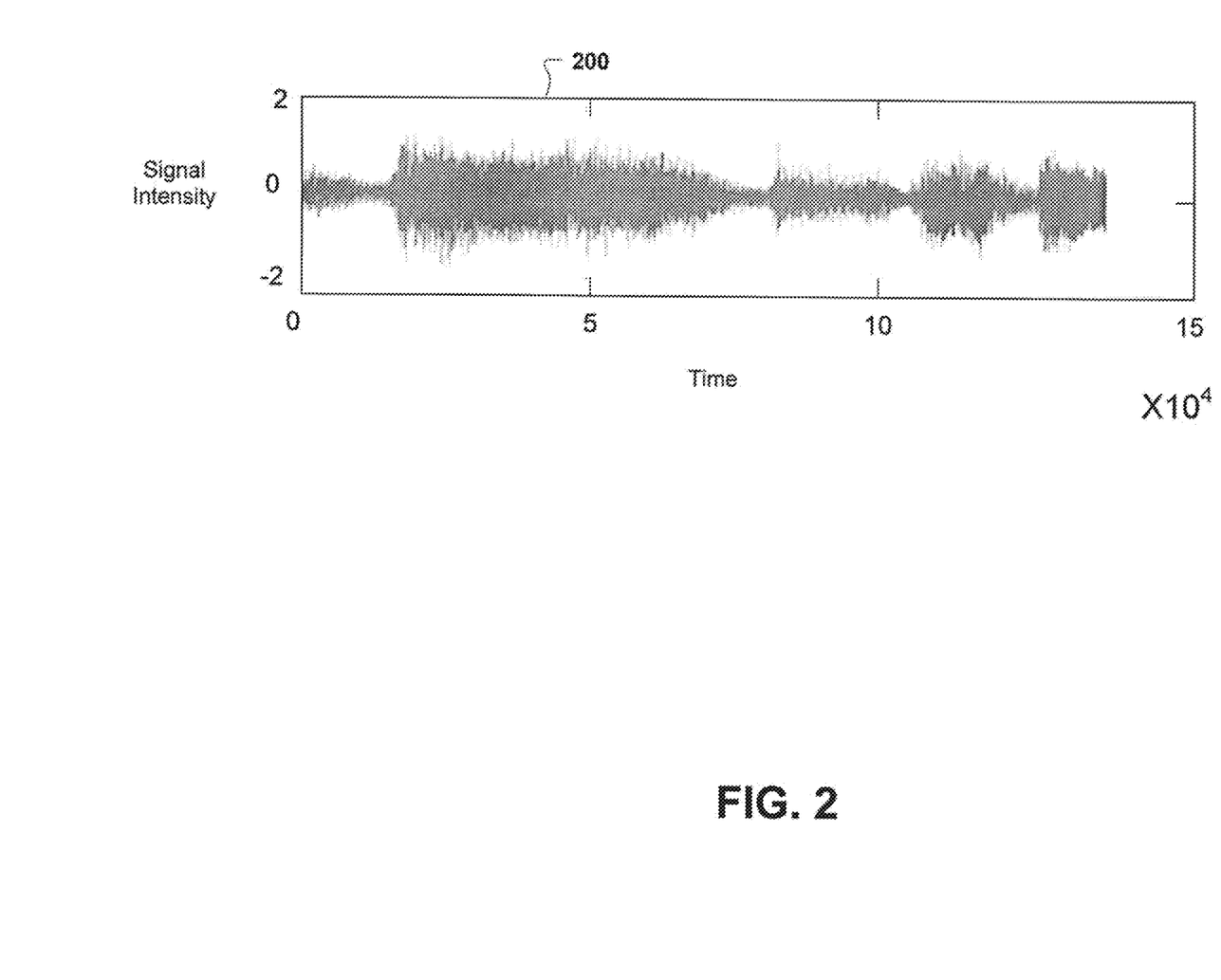
FIG. 2 is a time-domain waveform diagram of an exemplary audio signal according to embodiments of the present invention.

With regard to FIG. 2, a time domain waveform 200 of an exemplary-audio signal having a time of 12 seconds is depicted according to embodiments of the present invention. The audio signal has a sampling rate of 11,025 Hz and a quantization level of 16. An audio signal may be represented electronically (e.g., in a computer processor or memory) using a group of sampled and quantized one-dimensional signals. The sampling rate used may be, but is not limited to, 11,025 Hz. The quantization level used may be, but is not limited to, 16. As depicted in FIG. 2, the abscissa axis represents time, and the ordinate axis represents signal intensity. A short-time Fourier transform (STFT) is performed on the audio signal, and a spectrogram the audio signal is obtained.

Figure 3:
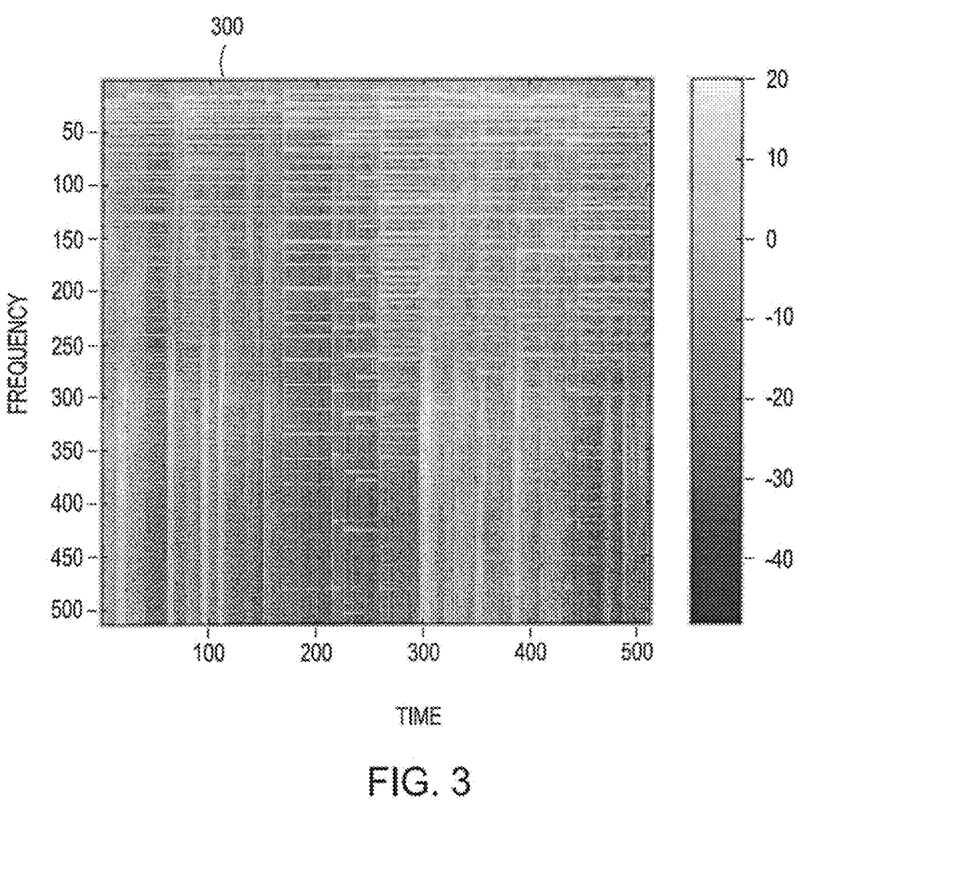
FIG. 3 is a spectrogram of an exemplary audio signal according to embodiments of the present invention.

With regard to FIG. 3, a spectrogram 300 of the exemplary audio signal depicted in FIG. 2 is depicted according to embodiments of the present invention, where the abscissa axis represents time, the ordinate axis represents frequency, the gray bar on the right represents a corresponding relation between energy and a gray value, and different gray values represent different energies. FIG. 2 with FIG. 3 illustrate that, compared with a time-domain waveform diagram, a spectrogram is more intuitive and can more clearly reflect energy distribution of audio signals in different periods of time at different frequencies.

According to some embodiments, when a user conducts an audio information retrieval, the user may acquire an audio clip. For example, the user may record an audio clip, such as a spoken words, sung lyrics, a melody, or the like, as a retrieved audio clip. Alternatively, the user may download from the Internet an audio clip, such as a complete piece of music, music segments, a ringtone, a speech, or the like, as a retrieved audio clip. The user may also acquire a local audio clip, such as a ringtone, a speech, a piece of music, or the like, as a retrieved audio clip. A time-frequency transform is performed on the retrieved audio clip, for example, a short-time Fourier transform (STFT), to acquire a spectrogram of the retrieved audio clip.

Figure 4:
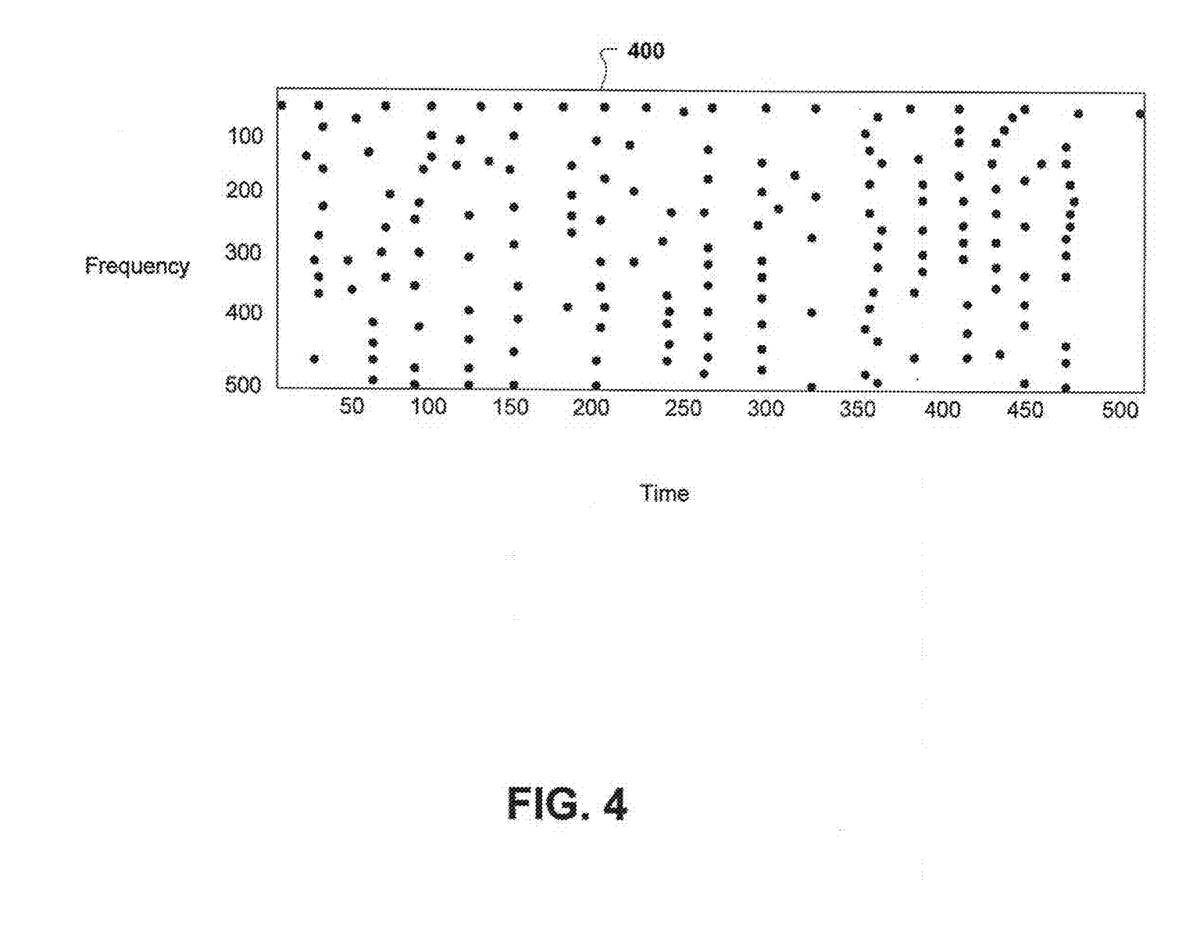
FIG. 4 is a distribution diagram of exemplary energy extreme points of an audio signal polluted by noise according to embodiments of the present invention.
Figure 5:
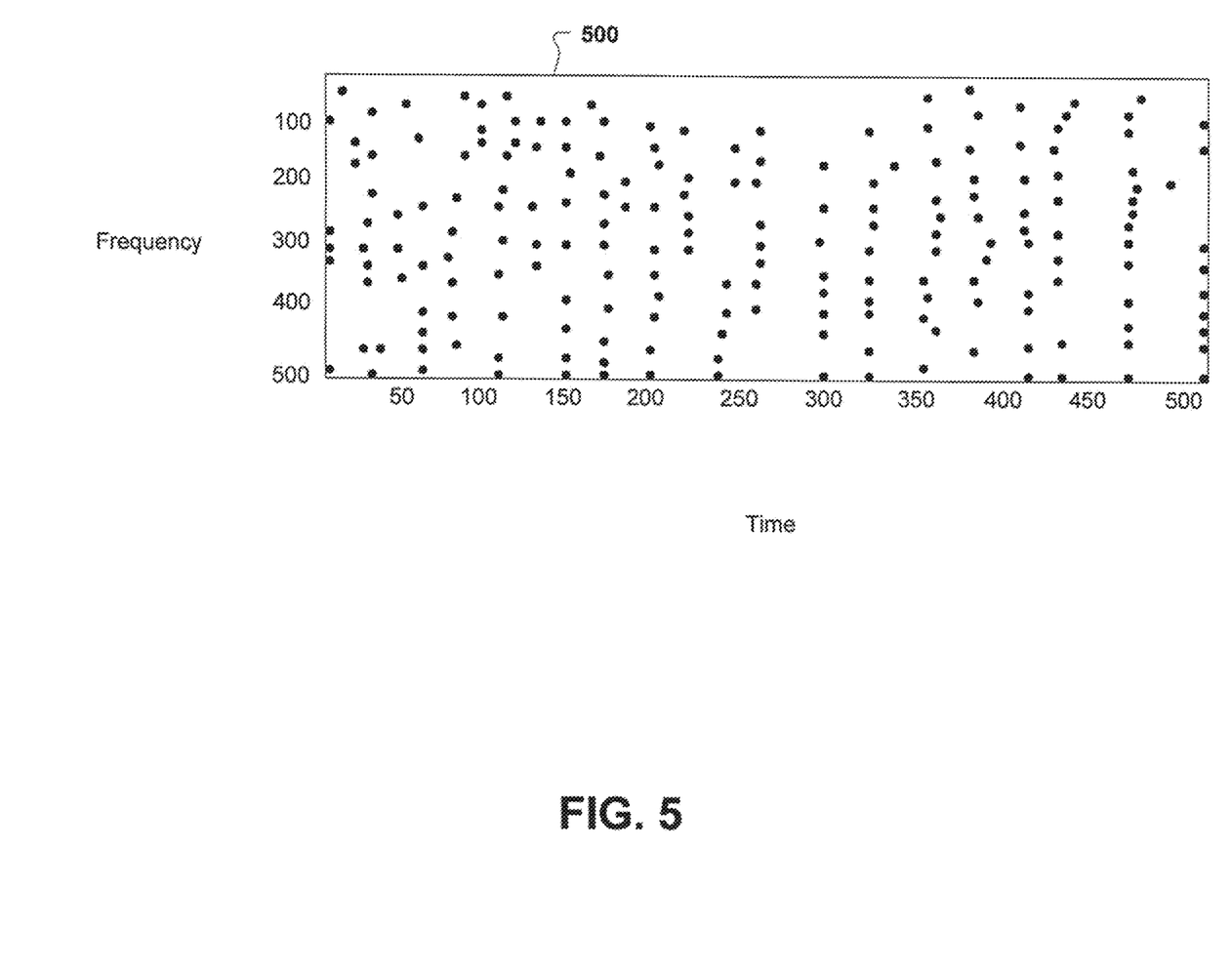
FIG. 5 is a distribution diagram of exemplary-energy extreme points of an audio signal unpolluted by noise according to embodiments of the present invention.

Several characteristics of an audio signal are included in the spectrogram thereof. However, the spectrogram may include a larger quantity of data and is susceptible to noise. Therefore, in some cases, the spectrogram cannot be effectively used for an audio retrieval directly. In order to reduce noise in the audio information retrieval process, and to reduce the computing/processing load, according to some embodiments, an energy extreme point on the spectrogram is used. FIG. 4 shows a distribution 400 of exemplary energy extreme points of an audio signal polluted by noise. FIG. 5 a shows distribution 500 of exemplary energy extreme points of the audio signal unpolluted by noise. Energy extreme points of the same audio signal are roughly distributed in the same position. These points can reflect characteristics of the audio signal and are relatively stable despite partial deviation. Thus, it is possible to distinguish between the same audio signal and different audio signals using energy extreme points in the associated spectrogram. Energy extreme points on the spectrogram may replace the spectrogram during the process of audio retrieval.

The strictly matched energy extreme points shown in FIG. 4 and FIG. 5 in the time coordinate may be affected by noise, and the frequency coordinate is below 10% of the total points. However, if surrounding characteristics of the energy extreme points are used, where a limitation on the time coordinate and the frequency coordinate is relaxed, roughly matched points may reach 50% of the total points. The more matched points that are identified, the more accurate the matching result is. For this reason, in order to acquire more matched points, surrounding characteristics of the energy extreme points may be used to represent energy extreme points so that the audio information retrieval process is conducted based on the surrounding characteristics of the energy extreme points. Surrounding characteristics of the energy extreme points may be referred to as local features of the energy extreme points. The local features may be various types of features, such as textural features, edge features, etc.

After the spectrogram of the audio clip is acquired, the local feature of at least one energy extreme point in the spectrogram is extracted to constitute a local feature sequence of the audio clip so that the local feature sequence can be used in subsequent retrieval steps. According to some embodiments, for using more energy extreme points, local characteristics of the energy extreme points are expressed to reduce the data size and the loss ratio. For example, a local binary pattern (LBP) feature, a histogram of oriented gradient (HoG) feature, a Haar feature, or the like may be used to express the local feature of energy extreme points. Corresponding algorithms may be used to acquire the LBP feature, the HoG feature, and the Haar feature.

The process of extracting a feature of the image block of each energy extreme point may include performing a random encoding on a size relationship among energy values represented by pixel points in the image block of each energy block, according to a designated encoding frequency, to acquire the feature of the image block, and using the feature of the image block as a local feature in the local feature sequence of the audio clip. The encoding frequency may be designated in advance, two pixel points are acquired from the image block at random, a size relationship between energy represented by the two pixel points acquired at random is encoded to acquire an encoding result, and the feature of the image block is acquired according to the encoding results until an encoding frequency reaches the designated encoding frequency.

The encoding method used may include binary encoding. For example, encoding may be performed using a value of 1 when energy represented by the first acquired pixel point is greater than energy represented by the second acquired pixel point. Encoding may use a value of 0 when energy represented by the first acquired pixel point is less than or equal to energy represented by the second acquired pixel point. Alternatively, a value of 0 may be used when energy represented by the first acquired pixel point is greater than energy represented by the second acquired pixel point, and a value of 1 is used when energy represented by the first acquired pixel point is less than or equal to energy represented by tire second acquired pixel point.

Using binary encoding, the process of acquiring the feature of the image block according to the encoding results may further include combining the encoding results into a binary sequence ordered according to an encoding sequence, where the binary sequence is used as the feature of the image block.

When a binary encoding on sizes of energy values represented by two pixels selected at random is performed, the designated encoding frequency is the same as the length of the binary sequence (e.g., 32-bit, 256-bit, etc.) The result of one encoding serves as one bit of the binary sequence.

After the local feature sequence of the audio clip is acquired, an audio information retrieval is performed according to the local feature sequence of the audio clip to acquire an audio information retrieval. The audio information retrieval may include various information related to the audio clip. The audio information retrieval includes, but is not limited to, information on an audio file of the audio clip. For example, the audio information retrieval may further include a time offset of the audio file of the audio clip.

The retrieval process uses the local feature of an energy extreme point to match an item in an audio feature library, where the feature library is established in advance and outputs information related to the audio clip according to a matching degree. Local feature sequences of the audio file are stored in the audio feature library.

The retrieval process may further include matching the local feature sequence of the audio clip with a local feature sequence of each audio file in the audio feature library to acquire a matching point pair of the audio clip and an audio file in the audio feature library, where the matching point pair is similar to the audio clip. For convenience, the audio file in the audio feature library that is similar to the audio clip is referred to as a similar audio file, and there may be one or more similar audio files. The process also may include determining a matching degree between the audio clip and the similar audio file based on the matching point pair of the audio clip and the similar audio file, and acquiring information of a similar audio file that has a maximum matching degree to be used as the audio information retrieval.

According to some embodiments, in addition to acquiring a matching degree between the audio clip and the similar audio file, a time offset of the audio clip in the similar audio file is determined based on the matching point pair of the foregoing to-be-retrieved audio clip and the similar audio file. Furthermore, the time offset corresponding to the maximum matching degree may be acquired as the audio information retrieval.

According to some embodiments, the local feature sequence of the audio clip includes a local feature of each energy extreme point in the audio clip, and the local feature sequence of each audio file includes a local feature of each energy extreme point in the audio file. The local feature sequence of the audio clip may further include a time coordinate and a frequency coordinate of each energy extreme point in the audio clip. Correspondingly, the local feature sequence of each audio file may further include a time coordinate and a frequency coordinate of each energy extreme point in the audio file. For example, information on each energy extreme point in the audio clip may be denoted as $(f_x^k\, t_x^k\, b_x^k)$, and information on each energy extreme point in the audio file may be denoted as $(f_y^l\, t_y^l\, b_y^l)$, where f stands for a frequency coordinate, t stands for a time coordinate, b stands for a local feature, k stands for a sequence number of an extreme point in the audio clip, and l stands for a sequence number of an energy extreme point in the audio file.

According to some embodiments, whether or not the audio clip is similar to the audio file is determined based on the distance among local features of energy extreme points. The distance may be compared using a Hamming distance, for example.

A Hamming distance among local features may represent whether or not energy extreme points are matched. For two audio clips from the same audio source, the difference between the two audio clips is due to the fact that one is a signal unpolluted by noise, and the other one is a signal polluted by noise. Hamming distances for local features of the energy extreme points in the two audio clips are calculated respectively.

Figure 6:
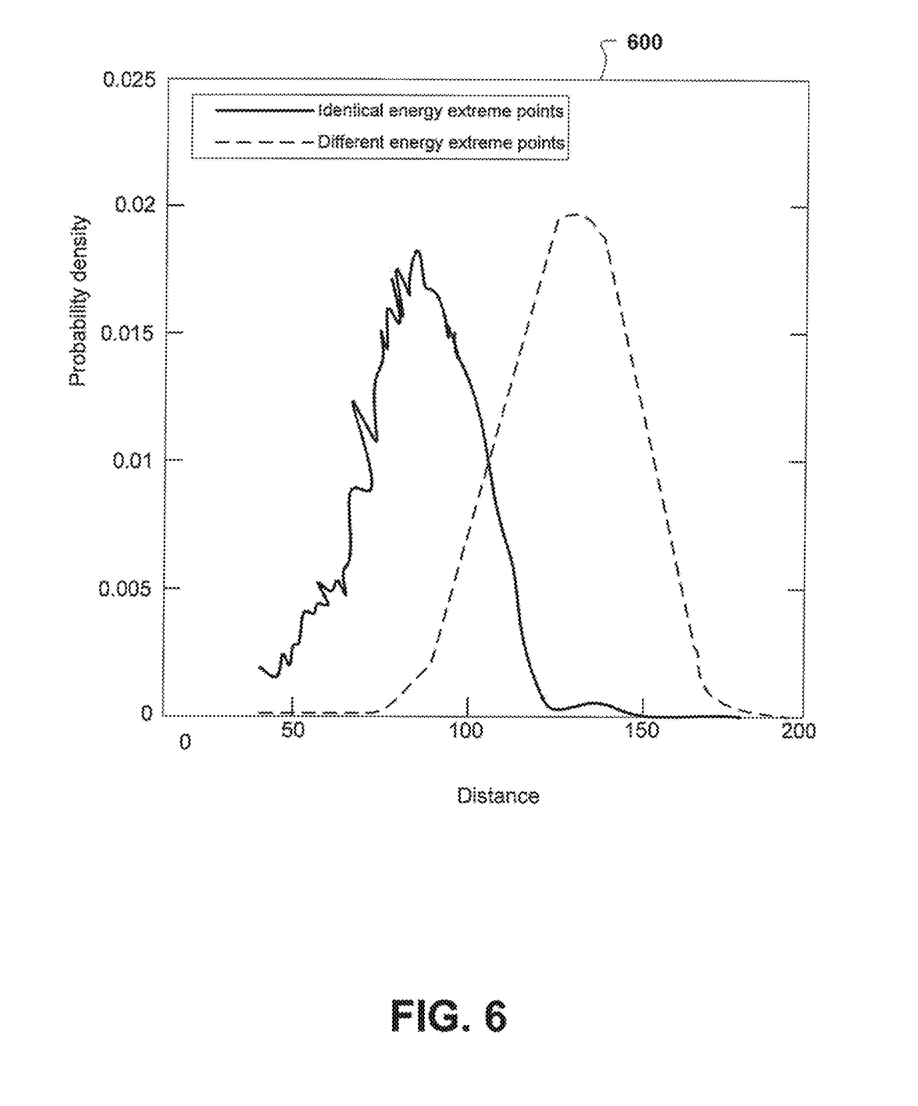
FIG. 6 is a schematic distribution diagram of exemplary Hamming distances calculated according to local features of the same energy extreme point and different energy extreme points according to embodiments of the present invention.

With regard to FIG. 6, an exemplary distribution of Hamming distances 600 is depicted according to embodiments of the present invention, where the solid line indicates the distribution of the Hamming distances among the same energy extreme points, and the dashed line indicates the distribution of the Hamming distances among different energy extreme points. The Hamming distances among the same energy extreme points are smaller than those among different energy extreme points. Therefore, a Hamming distance may be used to judge whether or not two energy extreme points are matched.

One exemplary method for acquiring a matching point pair of an audio clip and a similar audio file includes determining an extreme point subset in the audio file corresponding to each energy extreme point in the audio clip, according to a frequency coordinate of each energy extreme point in the audio clip, and a frequency coordinate of each energy extreme point in the audio file. For example, energy extreme points whose frequency coordinates are within the frequency range $[f_x^k - T_f,\, f_x^k + T_f]$ are selected from $(f_y^l\, t_y^l\, b_y^l)$ to constitute an extreme point subset, where $T_f$ is a frequency error threshold. The exemplary method further includes acquiring a distance between each energy extreme point in the audio clip, and the corresponding extreme point subset, according to a local feature of each energy extreme point in the audio clip, and to a local feature of energy extreme points in the corresponding extreme point subset. The distance between each energy extreme point in the audio clip and the corresponding extreme point subset refers to a minimum distance between each energy extreme point in the audio clip and energy extreme points in the corresponding extreme point subset. Furthermore, the exemplary method includes determining if distances between energy extreme points in the audio clip and the corresponding extreme point subset have a distance smaller than a preset feature threshold, determining if the audio file is a similar audio file of the audio clip, and determining if an energy extreme point in the audio clip corresponding to the distance smaller than the preset feature threshold and an energy extreme point in the audio are a matching point pair.

When the distances between the energy extreme points in the audio clip and the corresponding extreme point subset do not have a distance smaller than the preset feature threshold, the audio clip is not similar to the audio file, and the audio file may be ignored without subsequent processing to save retrieval resources.

After the matching point pair is acquired, the degree of similarity between the audio clip and the similar audio file may be measured by means of the number of the matching point pairs, and the difference in the mean value of the time coordinates of the matching point pairs is used as the time offset. Alternatively, the degree of similarity and the time offset or the like may be acquired using a weighted processing of the number of the matching point pairs, differences in the time coordinates, and the frequency coordinates of the matching point pairs.

A matching point pair may include mismatched points, and this may cause a lack of robustness in the calculation result when the matching degree and the time offset of the matching point pair are calculated directly. Therefore, according to some embodiments, a robustness effect is used, where the matching point pair of the audio clip and the similar audio file is processed using random sample consensus (RANSAC) or Hough Transform to acquire the matching degree between the audio clip and the similar audio file. The time offset of the audio clip in the similar audio file may also be acquired.

RANSAC provides a method for estimating robustness of a model parameter based on random sampling. According to some embodiments, a method for estimating robustness of a model parameter includes selecting a part of matching point pairs at random from matching point pairs between the audio clip and the similar audio file, conducting a model fitting according to the time coordinates of a part of the matching point pairs selected at random to acquire a candidate time offset of the audio clip in the similar audio file, and determining the number of non-noise point pairs in the matching point pairs selected to be used as a candidate matching degree between the audio clip and the similar audio file, acquiring multiple candidate time offsets and candidate matching degrees after multiple model fittings, selecting the maximum candidate matching degree as the matching degree between the audio clip and the similar audio file, and determining the candidate time offset corresponding to the maximum candidate matching degree to be used as the time offset of the audio clip in the similar audio file. One formula that may be used for model fitting is $t_y=t_x+o$, where o represents a time offset.

During model fitting, a part of the matching point pairs is selected at random. Eventually, the matching point pairs selected are non-noise point pairs, and a reasonable result is provided which may reduce the effect of noise. In addition, the algorithm is small in memory consumption.

According to some embodiments, the method for retrieving audio information further includes establishing an audio feature library. Establishing an audio feature library may include acquiring a spectrogram of an audio file, performing a time-frequency transform (e.g., a short-time Fourier transform) on the audio file to acquire the spectrogram, extracting a local feature of at least one energy extreme point in the spectrogram of the audio file to use as a local feature sequence of the audio file, and storing the local feature sequence of the audio file in the audio feature library.

According to some embodiments, the method for extracting a local feature of at least one energy extreme point in the spectrogram of the audio file to use as a local feature sequence of the audio file includes detecting an extreme point in the spectrogram of the audio file to acquire at least one energy extreme point. For example, a wave filter may be used to filter a maximum value on the spectrogram of the audio file to acquire the position of the energy maximum value on the spectrogram, where the size and the shape of the wave filter may be adjusted. The method further includes determining, in at least one energy extreme point, that the energy extreme points arc on an image block of the spectrogram. This may be accomplished, for example, by selecting on the spectrogram a window region where each energy extreme point serves as a center, where the window region is to be used as the image block of each energy extreme point. The size of the window region is not limited and may be adjusted. The method further includes extracting a feature of the image block of each energy extreme point to be used as a local feature sequence of the audio file. In other words, the feature of the image block of an energy extreme point is used as the local feature of the energy extreme point.

The process of extracting a feature of the image block of each energy extreme point may include performing a random encoding on a size relationship among energy values represented by pixel points in an image block according to a designated encoding frequency to acquire the feature of the image block, and use the feature of the image block as a local feature in the local feature sequence of the audio clip. The encoding frequency may be designated in advance, and two pixel points are acquired from the image block at random. A size relationship between energy values represented by the two pixel points acquired at random is encoded to acquire an encoding result, and the feature of the image block is acquired using the encoding results until an encoding frequency reaches the designated encoding frequency.

Increasing the number of audio files causes a greater amount of information to be stored in the audio feature library. As time goes on, the audio feature library may be updated at random.

Among the foregoing embodiments, descriptions of various embodiments may be focused on differences, and parts not expatiated in a certain embodiment may refer to a related description of other embodiments.

Figure 7:
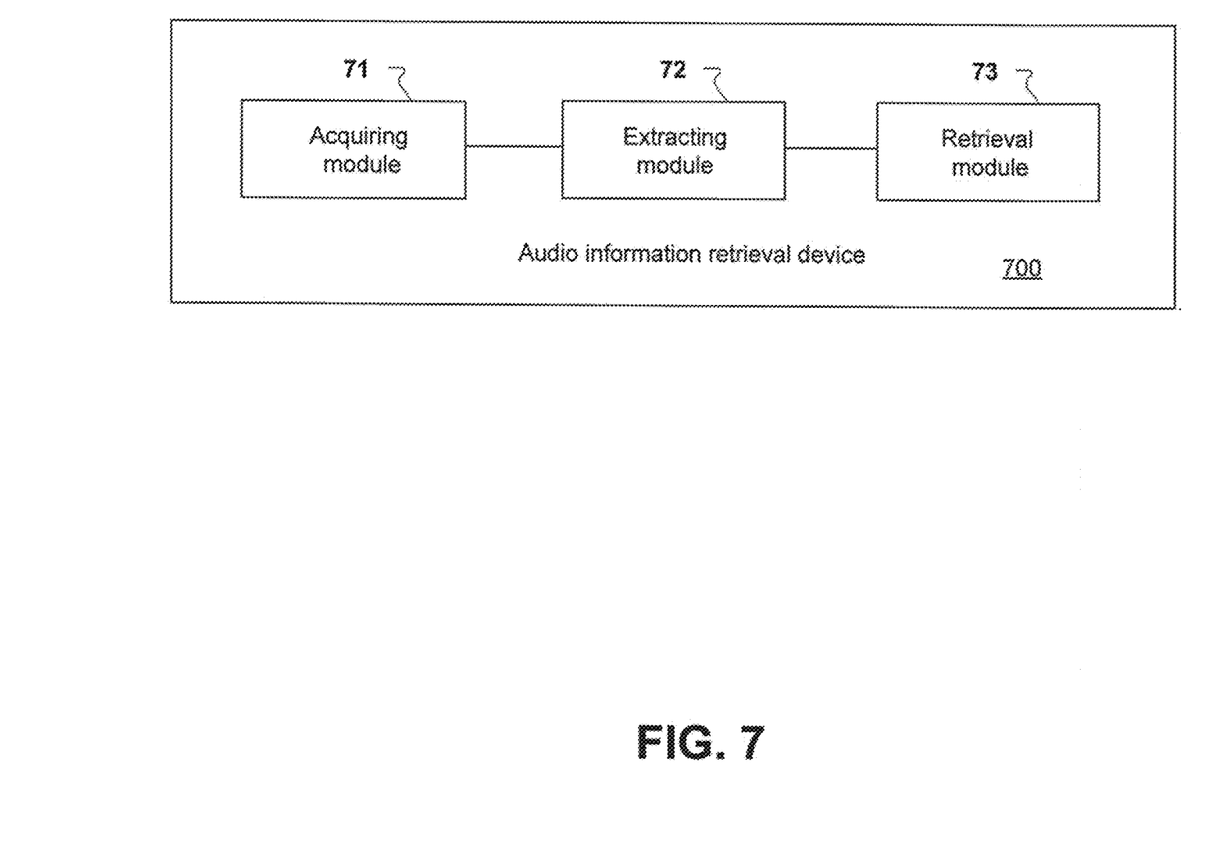
FIG. 7 is a schematic structural diagram of an exemplary audio information retrieval device according to an embodiment of the present invention.

With regard to FIG. 7, a block diagram of an exemplary audio information retrieval device 700 is depicted according to embodiments of the present invention. The exemplary device 700 includes acquiring module 71, extracting module 72, and retrieval module 73. Acquiring module 71 is configured to acquire a spectrogram of an audio clip. Extracting module 72 is configured to extract a local feature of at least one energy extreme point in the spectrogram acquired by acquiring module 71 to be used as a local feature sequence of the audio clip. Retrieval module 73 is configured to conduct an audio information retrieval according to the local feature sequence of the audio clip acquired by extracting module 72 to acquire an audio information retrieval.

According to some embodiments, extracting module 72 is configured to perform the following: detect an extreme point in the spectrogram to acquire at least one energy extreme point; determine, for at least one energy extreme point, if the energy extreme points are on an image block of the spectrogram; and extract a feature of the image block of the energy extreme points to be used as a local feature sequence of the audio clip. Furthermore, when it is determined, in at least one energy extreme point, that each energy extreme point is on an image block of the spectrogram, extracting module 72 is configured to select, on the spectrogram, a window region (where each energy extreme point serves as a center) that is used as the image block of each energy extreme point.

Furthermore, when a feature of the image block of each energy extreme point is extracted to obtain a local feature sequence of the audio clip, extracting module 72 is configured to perform the following: for the image block of each energy extreme point, perform a random encoding on a size relationship among energy values represented by pixel points in the image block according to a designated encoding frequency to acquire a feature of the image block, and use the feature of the image block as a local feature in the local feature sequence of the audio clip.

Additionally, extracting module 72 may be configured to acquire two pixel points from the image block at random each time and encode a size relationship between energy values represented by the two pixel points to acquire an encoding result, and acquire a feature of the image block according to the encoding results until an encoding frequency reaches the designated encoding frequency.

According to some embodiments, retrieval module 73 is configured to match the local feature sequence of the audio clip with a local feature sequence of each audio file in an audio feature library to acquire a matching point pair of the audio clip and a similar audio file, where the similar audio file refers to an audio file in the audio feature library that is similar to the audio clip. Retrieval module 73 is also configured to acquire a matching degree between the audio clip and the similar audio file according to the matching point pair of the audio clip and the similar audio file, and acquire information of a similar audio file having a maximum matching degree to be used as the audio information retrieval.

When the matching point pair of the audio clip and the similar audio file is acquired, retrieval module 73 is configured to determine an extreme point subset in the audio file corresponding to each energy extreme point in the audio clip, according to a frequency coordinate of each energy extreme point in the audio clip, and further according to a frequency coordinate of each energy extreme point in the audio file. Retrieval module 73 is also configured to acquire a distance between each energy extreme point in the audio clip and the corresponding extreme point subset according to a local feature of each energy extreme point in the audio clip, and further according to a local feature of energy extreme points in a corresponding extreme point subset, where the distance between each energy extreme point in the audio clip and the corresponding extreme point subset is based on a minimum distance between the energy extreme point in the audio clip and energy extreme points in the corresponding extreme point subset. Additionally, retrieval module 73 is configured to determine if distances between energy extreme points in the audio clip and the corresponding extreme point subset have a distance smaller than a preset feature threshold, determine an energy extreme point in the audio clip having a distance smaller than the preset feature threshold, and identify an energy extreme point in the audio file to be used as a matching point pair.

When the matching degree between the audio clip and the similar audio file is acquired, retrieval module 73 is specifically configured to process the matching point pair of the audio clip and the similar audio file (e.g., using RANSAC or Hough Transform) to acquire the matching degree between the audio clip and the similar audio file.

According to some embodiments, retrieval module 73 is configured to perform the following: acquire a time offset between the audio clip and the similar audio file according to the matching point pair of the audio clip and the similar audio file, and acquire the time offset corresponding to the maximum matching degree to be used as the audio information retrieval.

Figure 8:
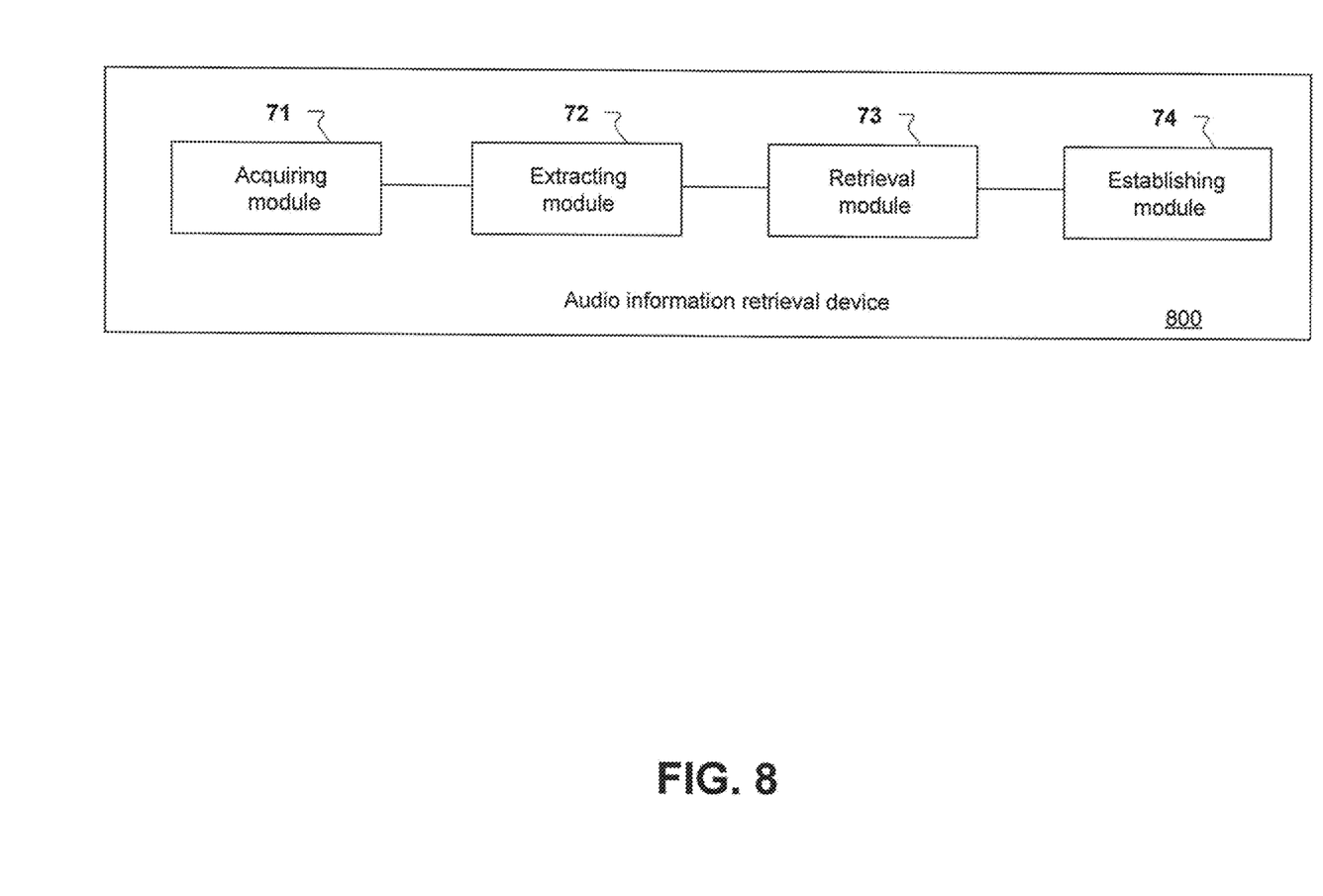
FIG. 8 is a schematic structural diagram of an exemplary audio information retrieval device according to embodiments of the present invention.

With regard to FIG. 8, a block diagram of an exemplary audio information retrieval device 800 is depicted according to embodiments of the present invention. Audio information retrieval device 800 includes establishing module 74. Establishing module 74 is configured to establish an audio feature library and may perform the following steps: acquire a spectrogram of an audio file, extract a local feature of at least one energy extreme point in the spectrogram of the audio file to be used as a local feature sequence of the audio file, and store the local feature sequence of the audio file in the audio feature library. The audio information retrieval device 800 acquires the spectrogram of the audio clip, extracts the local feature of at least one energy extreme point in the spectrogram to be used as a local feature sequence of the audio clip, and conducts the audio information retrieval according to the local feature sequence of the audio clip to acquire an audio information retrieval. The audio information retrieval process may include using a local feature of an energy extreme point in the spectrogram instead of the energy extreme point itself, which is equivalent to broadening a matching scope of a time coordinate and a frequency coordinate, thereby increasing the number of matching points. In this case, the local feature of the energy extreme point is less sensitive to random noise and Salt-and-Pepper noise than the energy extreme point. Although a slight offset occurs, the offset does not have a significant impact on the matching result. Therefore, the problem of existing techniques, where extreme point deviation causes a missed match, is solved, and the accuracy of the audio information retrieval is improved.

Figure 9:
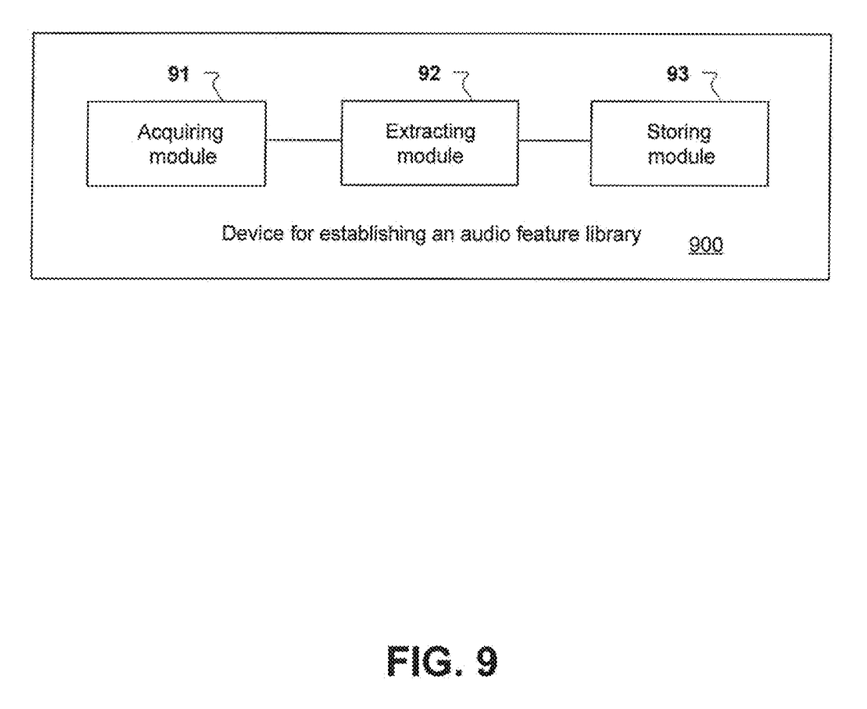
FIG. 9 is a schematic structural diagram of an exemplary device for establishing an audio feature library according to embodiments of the present invention.

With regard to FIG. 9, a block diagram of an exemplary device 900 for creating an audio feature library is depicted according to embodiments of the present invention. Device 900 includes acquiring module 91, extracting module 92, and storing module 93. Acquiring module 91 is configured to acquire a spectrogram of the audio file. Extracting module 92 is configured to extract a local feature of at least one energy extreme point in the spectrogram of the audio file acquired by acquiring module 91 to be used as a local feature sequence of the audio file. Storing module 93 is configured to store the local feature sequence of the audio file extracted by extracting module 92 in the audio feature library.

Extracting module 92 is configured to detect an extreme point in the spectrogram of the audio file, and acquire at least one energy extreme point. For example, a wave filter may be used to filter a maximum value on the spectrogram of the audio file to acquire the position of the energy maximum value on the spectrogram, where the size and the shape of the wave filter may be adjusted according to specific application. Further, extracting module 92 is configured to determine, for at least one energy extreme point, that the energy extreme point is on an image block of the spectrogram, and a window region, where each energy extreme point serves as a center, is selected to be used as the image block of each energy extreme point. The size of the window region is not limited to a specific size and may be adaptively set/adjusted. Further, extracting module 92 is configured to extract a feature of the image block of each energy extreme point to be used as a local feature sequence of the audio file. In other words, the feature of the image block of an energy extreme point is used as the local feature of the energy extreme point.

When a feature of the image block of the energy extreme points is extracted, extracting module 92 is configured to perform the following: perform a random encoding on a size relationship among energy values represented by pixel points in the image block according to a designated encoding frequency to acquire a feature of the image block, and use the feature of the image block as a local feature in the local feature sequence of the audio clip. According to some embodiments, the encoding frequency is designated in advance, two pixel points are acquired from the image block at random each time, a size relationship between energy values represented by the two pixel points acquired at random is encoded to acquire an encoding result, and the features of the image block are acquired according to the encoding results until an encoding frequency reaches the designated encoding frequency.

According to some embodiments, the device for establishing an audio feature library acquires a spectrogram of an audio file, extracts a local feature of at least one energy extreme point in the spectrogram to be used as a local feature sequence of the audio file, and stores the local feature sequence of the audio file in an audio feature. The audio feature library stores a local feature of an energy extreme point in the spectrogram instead of the energy extreme point, which broadens a matching scope of a time coordinate and a frequency coordinate in the matching process, thereby increasing the number of matching points. Therefore, the local feature of the energy extreme point is less sensitive to random noise and Salt-and-Pepper noise than when the energy extreme point is used. Although a slight offset takes place, the offset does not have a significant impact on the matching result. Therefore, the problem of existing techniques, where extreme point deviation may result in a missed match is solved, and the accuracy of the audio information retrieval is improved.

From the embodiments described in the application, it should be understood that the disclosed systems, devices, and methods may be implemented by means of other manners. The device embodiments described above are merely exemplary. For example, multiple units or components may be combined or integrated into another system, or some features may be ignored and not executed. Additionally, intercoupling or direct coupling or communications connection displayed or discussed may use indirect coupling or a communications connection, electrical or mechanical, or in other forms, by means of an interface, device, or unit.

The unit serving as a detached component may be or not be physically detached, the component serving as a unit display may be or not be a physical unit, that is, either located at one place or distributed on a plurality of network elements. Units may be selected in part or in whole according to actual needs for achieving objectives of the solution of the embodiments.

In addition, various functional units in various embodiments of the application may be integrated into one processing unit, or various units may be separately or physically existent, or two or more units may be integrated into one unit. The foregoing integrated units may either be implemented in the form of hardware or be implemented in the form of hardware and software function units.

The foregoing integrated units may be stored in a computer-readable storage medium if they are implemented in the form of software function units. The foregoing software function units are stored in a storage medium, comprising some instructions to cause a computer device (a personal computer, a server, a network device, or the like) or a processor to execute a part of steps of the method as recited in the embodiments of the application. The aforementioned storage medium may comprise the following: a USB flash disk, a mobile hard disk, a read-only memory (ROM), a random-access memory (RAM), a magnetic disk or an optical disk, and other media capable of storing a program code.

Finally, it should be noted that the foregoing embodiments are merely intended for describing the technical solutions of the application, not for limiting the application. Although the application is described in detail with reference to the foregoing embodiments, persons of ordinary skill in the art should understand that they may still make modifications to the technical solutions described in the foregoing embodiments or make equivalent replacements to some technical features thereof, which does not make corresponding technical solutions, in essence, depart from the spirit and the scope of the technical solutions of the embodiments of the application.

What is claimed is:

1. A method for retrieving audio information from an audio clip, comprising:
    acquiring an image of a spectrogram of the audio clip;
    identifying a number of energy extreme points in the image of the spectrogram;
    defining a number of window regions around the number of energy extreme points such that each window region includes only one energy extreme point;
    selecting a plurality of point pairs within each window region, each point pair having a first acquired point and a second acquired point;
    assigning a bit to each point pair in a window region;
    for each point pair in the window region, assigning a first logic level to the bit assigned to a point pair when an energy level of the first acquired point of the point pair is greater than an energy level of the second acquired point of the point pair, and a second logic level when the energy level of the first acquired point of the point pair is less than the energy level of the second acquired point of the point pair; and
    generating a local digital value for each window region, the local digital value for the window region including the bit assigned to each point pair in the window region; and
    combining the local digital value of each window region to form a local feature sequence of the audio clip.

2. The method of claim 1, wherein:
    the plurality of point pairs in the window region are selected from an area that surrounds the energy extreme point in the window region.

3. The method of claim 1, wherein the local digital value for the window region further includes bits that represent a frequency coordinate and a time coordinate of the energy extreme point in the window region.

4. A method for retrieving audio information from an audio clip, comprising:
    acquiring an image of a spectrogram of the audio clip, the image having a plurality of pixel points, each pixel point representing an energy value;
    identifying a number of energy extreme pixel points from the plurality of pixel points in the image of the spectrogram;
    defining a number of window regions around the number of energy extreme pixel points such that each window region includes a number of pixel points of the plurality of pixel points and only one energy extreme pixel point;
    extracting a local feature from each window region, the extracting including:
        acquiring a pixel point pair from the number of pixel points in a window region, the pixel point pair including a first pixel point and a second pixel point;
        assigning a bit to the pixel point pair;
        assigning a first logic level to the bit assigned to the pixel point pair when an energy level of the first pixel point of the pixel point pair is greater than an energy level of the second pixel point of the pixel point pair, and a second logic level when the energy level of the first pixel point of the pixel point pair is less than the energy level of the second pixel point of the pixel point pair; and generating a local digital value for the window region, the local digital value for the window region including the bit assigned to the pixel point pair in the window region, the local feature for the window region including the local digital value; and adding the local feature from each window region to a local feature sequence of the audio clip; and requesting the audio information from the audio clip based on the local feature sequence of the audio clip.

5. The method of claim 1, further comprising:

searching an audio library to find an audio file that has a stored feature sequence that matches the local feature sequence, the energy extreme points in the image of the spectrogram of the audio clip being similar to a number of energy extreme points in an image of a spectrogram of the audio file when the stored feature sequence matches the local feature sequence;

determining a degree to which each energy extreme point in the image of the spectrogram of the audio clip matches a corresponding similar energy extreme point in the image of the spectrogram of the audio file; and determining that an energy extreme point in the image of the spectrogram of the audio clip and an energy extreme point in the image of the spectrogram of the audio file are a matching point pair when the degree exceeds a matching degree threshold.

6. The method of claim 5, wherein determining the degree includes:

determining if a distance between the energy extreme point from the image of the spectrogram of the audio clip and the energy extreme point from the image of the spectrogram of the audio file is less than a preset feature threshold; and determining that the energy extreme point from the image of the spectrogram of the audio clip and the energy extreme point from the image of the spectrogram of the audio file are a matching point pair when the distance is less than the preset feature threshold.

7. The method of claim 5, wherein determining a degree includes processing the matching point pair of the audio clip and the audio file using a RANSAC Transform or a Hough Transform.

8. The method of claim 5, further comprising determining a time difference between the energy extreme point from the image of the spectrogram of the audio clip and the energy extreme point from the image of the spectrogram of the audio file when the energy extreme point from the image of the spectrogram of the audio clip and the energy extreme point from the image of the spectrogram of the audio file are a matching point pair.

9. The method of claim 6, further comprising determining if the audio clip matches the audio file based on information that includes a total number of matching point pairs.

10. A method for storing a local feature sequence in an audio feature library, comprising:

acquiring an image of a spectrogram of an audio file, the image having a plurality of pixel points, each pixel point representing an energy level;

identifying a number of energy extreme pixel points from the plurality of pixel points in the image of the spectrogram;

defining a number of window regions around the number of energy extreme pixel points such that each window region includes a number of pixel points of the plurality of pixel points and only one energy extreme pixel point;

selecting a plurality of pairs of pixel points from the number of pixel points within each window region, each pair of pixel points having a first pixel point and a second pixel point;

assigning a bit to each pair of pixel points in a window region;

for each pair of pixel points in the window region, assigning a first logic level to the bit assigned to a pair of pixel points when an energy level of the first pixel point of the pair of pixel points is greater than an energy level of the second pixel point of the pair of pixel points, and a second logic level when the energy level of the first pixel point of the pair of pixel points is less than the energy level of the second pixel point of the pair of pixel points; and generating a local digital value for each window region, the local digital value for the window region including the bit assigned to each pair of pixel points in the window region;

combining the local digital value of each window region to form a local feature sequence of the audio file; and storing the local feature sequence of the audio file in the audio feature library.

11. An audio information device, comprising:

a main memory; and a processor communicatively coupled to the main memory to:

acquire a representation of a spectrogram of an audio clip, the representation having a plurality of points, each point representing an energy level, identify a number of energy extreme points from the plurality of points in the representation of the spectrogram, define a number of window regions around the number of energy extreme points such that each window region includes a number of points of the plurality of points and only one energy extreme point, select a pair of points from the number of points in a window region, the pair of points having a first point and a second point, assign a bit to the pair of points in the window region, assign a first logic level to the bit assigned to the pair of points when an energy level of the first point of the pair of points is greater than an energy level of the second point of the pair of points, and a second logic level when the energy level of the first point of the pair of points is less than the energy level of the second point of the pair of points, and generate a local digital value for each window region, the local digital value for the window region including the bit assigned to the pair of points in the window region, and combine the local digital value of each window region to form a local feature sequence of the audio clip.

12. The device of claim 11, wherein the representation includes an image.

13. The device of claim 11, wherein the local digital value for the window region further includes bits that represent a frequency coordinate and a time coordinate of the energy extreme point in the window region.

14. An audio information device, comprising:

a main memory; and a processor communicatively coupled to the main memory that:

acquires a representation of a spectrogram of an audio clip, the representation having a plurality of points, each point representing an energy value;

identifies a number of energy extreme points in the representation of the spectrogram;

defines a number of window regions around the number of energy extreme points such that each window region includes a number of points of the plurality of points and only one energy extreme point;

extracts a local feature from each window region to generate a local feature sequence of the audio clip, the local feature being extracted by:

acquiring a point pair from the number of points in a window region, the point pair including a first point and a second point;

assigning a bit to the point pair in the window region;

assigning a first logic level to the bit assigned to the point pair when an energy level of the first point of the point pair is greater than an energy level of the second point of the point pair, and a second logic level when the energy level of the first point of the point pair is less than the energy level of the second point of the point pair; and     generating a local digital value for the window region, the local digital value for the window region including the bit assigned to the point pair in the window region, the local feature for the window region including the local digital value.

15. The device of claim 14, wherein the processor:

matches the local feature sequence of the audio clip with a stored feature sequence of an audio file in an audio feature library to acquire a matching point pair, the matching point pair including a first point of the audio clip and a second point of the audio file, the audio file being substantially similar to the audio clip;

acquires a matching degree between the audio clip and the audio file based on the matching point pair of the audio clip and the audio file; and acquires information of the audio file, wherein when a plurality of similar audio files are present, selecting the similar audio file that has a highest matching degree.

16. The device of claim 15, wherein the processor:

determines an extreme point subset in the audio file corresponding to the energy extreme points in the audio clip based on a first frequency coordinate of the energy extreme points in the audio clip, and based on a second frequency coordinate of the energy extreme points in the audio file;

acquires a distance between the energy extreme point in the audio clip and the extreme point subset according to a first local feature of each energy extreme point in the audio clip and a second local feature of the energy extreme points in the extreme point subset, the distance between the energy extreme point in the audio clip and the extreme point subset indicating a minimum distance between the energy extreme point in the audio clip and the energy extreme points in the extreme point subset;

determines that the audio file is substantially similar to the audio clip when the distance between energy extreme points in the audio clip and the extreme point subset is smaller than a preset feature threshold; and uses the energy extreme point in the audio clip and the energy extreme point in the audio file as the matching point pair.

17. The device of claim 16, wherein the processor processes the matching point pair using a RANSAC Transform or a Hough Transform to acquire the matching degree between the audio clip and the audio file.

18. The device of claim 15, wherein the processor acquires a time offset of the audio clip and the audio file using the matching point pair, and retrieves information of the audio file when the time offset of the audio file remains below a matching degree limit.

19. The device of claim 18, wherein the processor:

creates a new audio feature library;

acquires a spectrogram of the audio file;

extracts a local feature of an energy extreme point in the spectrogram of the audio file to be used in the local feature sequence of the audio file.

20. The device of claim 19, wherein the processor stores the local feature sequence of the audio file in the new audio feature library.

\* \* \* \* \*